United States Patent [19]
Smith et al.

[11] 3,832,061
[45] Aug. 27, 1974

[54] SPECTROMETERS

[75] Inventors: Stanley Desmond Smith, Midlothian; Roland Andrew Wood, Edinburgh; Richard Benson Dennis, Midlothian, all of Scotland

[73] Assignee: National Research Development Corporation, London, England

[22] Filed: Feb. 13, 1973

[21] Appl. No.: 332,222

[30] Foreign Application Priority Data
Feb. 18, 1972  Great Britain.................... 7616/72

[52] U.S. Cl..................... 356/88, 356/204, 356/206
[51] Int. Cl. ............................................. G01j 3/42
[58] Field of Search............ 331/94.5 C; 356/51, 88, 356/93–98, 201, 204–206; 250/218

[56] References Cited
UNITED STATES PATENTS
3,435,373  3/1969  Wolff............................ 331/94.5 C
3,487,225  12/1969  Button............................. 250/218 X
3,540,825  11/1970  Grojean............................... 356/88
3,588,253  6/1971  Wittmann......................... 356/95 X Primary Examiner—Ronald L. Wibert
Assistant Examiner—F. L. Evans
Attorney, Agent, or Firm—Cushman, Darby & Cushman

[57] ABSTRACT

In a spectrometer using a tunable pulsed spin-flip Raman laser as the radiation source, the output of the laser is split into sample and reference beams which are arranged to fall on separate detectors. The ratio of the outputs of the two detectors is computed for each pulse from the laser by means of an electronic system triggered by pulses derived from one of the detectors.

2 Claims, 1 Drawing Figure

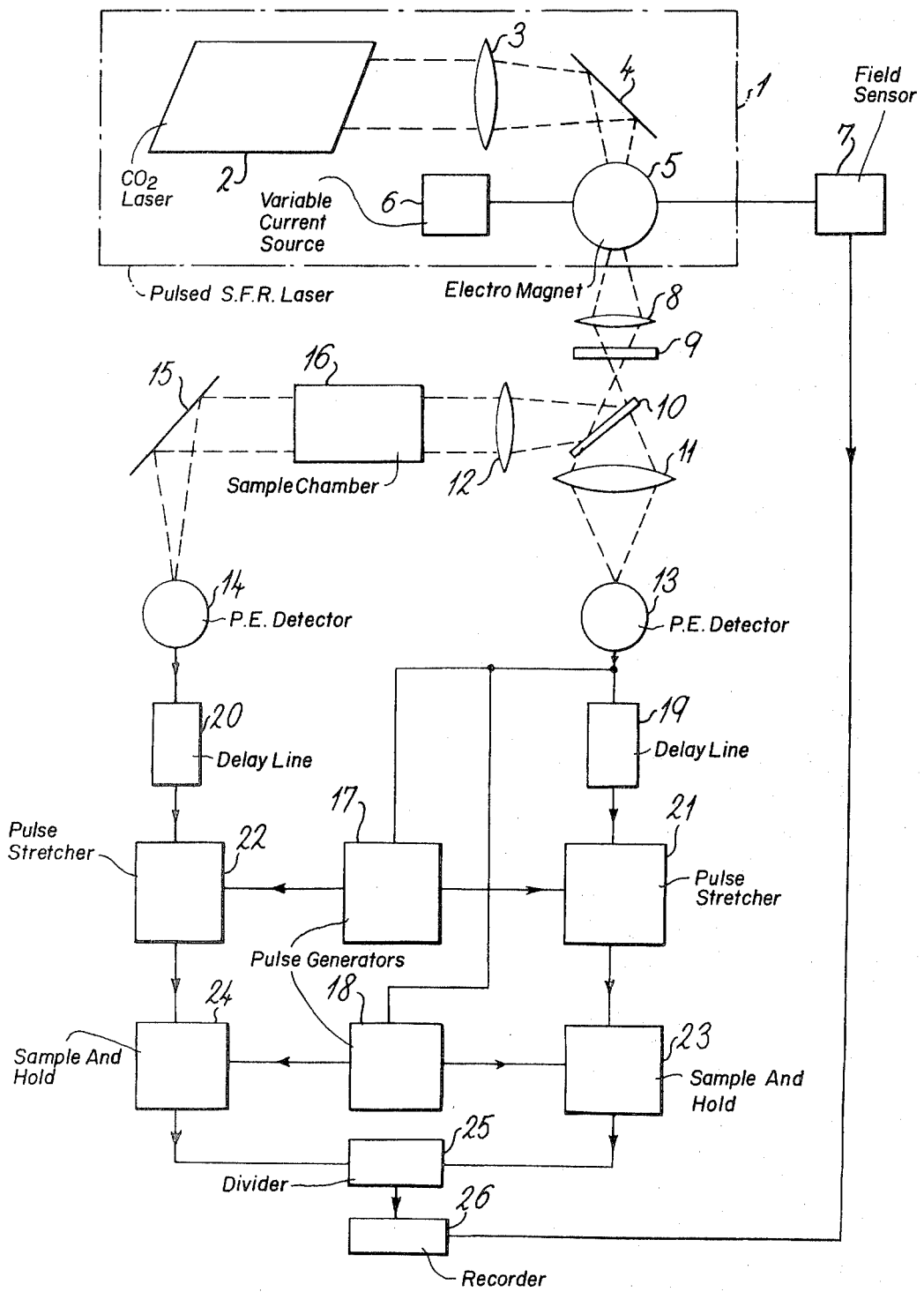

SPECTROMETERS

In recent times considerable attention has been directed to the possibility of enhancing the scope of infrared spectrometry by the use of a pulsed spin-flip Raman laser as the tunable radiation source in a spectrometer. Such a laser provides an output of high intensity having components of frequencies tunable over wide ranges in the infra-red by variation of a magnetic field.

In the practical application of this idea some problems arise because of variability of the output of the laser for different values of the magnetic field and from pulse to pulse with a given magnetic field, and because of variability of the timing of the output pulses relative to that of the pulses of pumping radiation.

The present invention provides an arrangement whereby these problems may be overcome, and consists in a spectrometer comprising a tunable pulsed spin-flip Raman laser, means for splitting the output of the laser into sample and reference beams and for directing the sample beam on to a sample under investigation, a first detector for detecting the intensity of the reference beam, a second detector for detecting the intensity of the sample beam after its interaction with the sample, and means, operative in response to the reception of a pulse of radiation by one of the detectors, for computing for each output pulse from the laser the ratio of the outputs of the two detectors.

One arrangement in accordance with the invention will now be described by way of example with reference to the accompanying drawing, which is a diagram of the optical layout and electronic circuit of an infra-red spectrometer.

Referring to the drawing, the spectrometer incorporates a radiation source in the form of a tunable pulsed spin-flip Raman laser, generally designated by the reference 1. The laser 1 includes a source of pumping radiation in the form of a pulsed carbon dioxide laser 2, the wavelength of the pumping radiation being in the region of 10 microns and its precise value being selected by incorporation of appropriate dispersive elements in the laser 2. The output of the laser 2 is concentrated by a lens 3 and is deflected by a mirror 4 so as to be incident on a crystal of a suitable semiconductor (for example, N-type indium antimonide) disposed within an electromagnet 5 which is energised by a variable current source 6; the semi-conductor crystal is maintained at a very low temperature and the magnet 5 may be a super-conducting magnet. The semi-conductor crystal, which may typically have dimensions of 10 by 2 by 2 mm, is disposed with its longitudinal axis perpendicular to the magnetic field, and the pumping radiation is arranged to be incident upon one end face of the crystal in a direction parallel to this axis, the pumping radiation being focused so as to provide sufficient power density to produce stimulated Raman gain within the crystal, and the crystal end faces being polished to form a laser resonator cavity. As a result, output radiation emerges from the end face of the crystal opposite that on which the pumping radiation is incident, the output radiation comprising components at frequencies $F_o$, $F_o \pm F_s$, and $F_o - 2F_s$, where $F_o$ is the frequency of the pumping radiation and $F_s$ is a frequency, dependent on the strength of the magnetic field, corresponding to an electronic spin-reversal transition in the semi-conductor. The output radiation thus contains components which are tunable in frequency by variation of the strength of the magnetic field, this quantity being detected by a field sensor 7 associated with the magnet 5.

The output radiation from the laser 1 is collected by a lens 8 and is passed through a filter 9 which is selected to pass one of the tunable components and to reject the other components of the output radiation from the laser 1. The radiation passing through the filter 9 is split by means of a beam-splitter plate 10 into reference and sample beams which are respectively focused by means of lenses 11 and 12 on to suitable photo-electric detectors 13 and 14, the sample beam being directed on to the detector 14 by a mirror 15; a sample chamber 16 is disposed in the path of the sample beam, the chamber 16 containing a substance under investigation when the spectrometer is in use. The reference and sample beams are arranged to be approximately equal in intensity and to have approximately equal path lengths, so that when no sample is present in the chamber 16 the outputs of the detectors 13 and 14 will be substantially equal. If desired, the optical paths between the magnet 5 and detectors 13 and 14 may be arranged within an enclosure (not shown) filled with an inert gas to eliminate the effects of atmospheric absorption.

On the occurrence of a pulse of output radiation (which would typically have a duration of the order of 0.1 microseconds) from the laser 1, corresponding electric pulse signals will be produced by the detectors 13 and 14, the magnitudes of both these signals being proportional to the intensity of the output radiation of the laser 1, and the magnitude of the signal produced by the detector 14 also being dependent upon the attenuation of the sample beam suffered during its transit of the chamber 16. The pulse produced by the detector 13 is used to trigger two pulse generators 17 and 18 whose functions are explained below. The pulses produced by the detectors 13 and 14 are respectively fed to identical delay lines 19 and 20, each of which provides a signal delay of about 0.4 microsecond. The outputs of the delay lines 19 and 20 are, respectively, fed to pulse stretchers 21 and 22 which are triggered by pulses derived from the generator 17, the pulse stretchers 21 and 22 operating to provide output signals of considerably longer duration (typically of the order of 10 microseconds) than those of the pulses applied to their inputs, and having magnitudes proportional to those of the input pulses. The outputs from the pulse stretchers 21 and 22 are respectively converted to D.C. signals proportional to the magnitudes of the pulse signals by means of two sample-and-hold circuits 23 and 24 which are triggered by pulses derived from the generator 18. Each pulse from the laser 1 thus results in re-setting of the D.C. levels respectively generated by the circuits 23 and 24, which are applied to a divider circuit 25 that computes the ratio of these D.C. levels. It will be appreciated that the output of the divider circuit 25 gives a measure of the absorption of the radiation of the relevant wavelength in the sample in the chamber 16, which is not affected by variations in the intensity of the output pulses from the laser 1. The output from the divider circuit 25 is fed to a recorder 26 together with a signal from the magnetic field sensor 7, thus enabling a representation to be obtained of the variation of the sample absorption as a function of the radiation wavelength.

It will be appreciated that, since the operation of the spectrometer is not dependent on the repetition rate of the radiation pulses generated by the laser 1, it is possible by triggering the pump laser 2 at appropriate instants to investigate transient conditions in the sample.

We claim:

1. A spectrometer comprising a tunable pulsed spin-flip Raman laser, means for splitting the output of the laser into sample and reference beams and for directing the sample beam on to a sample under investigation, a first detector for detecting the intensity of the reference beam, a second detector for detecting the intensity of the sample beam after its interaction with the sample, and computing means, for performing a separate computation of the ratio of the outputs of the two detectors in respect of each output pulse from the laser, said computing means including triggering means, operative in response to the reception of a pulse of radiation by one of the detectors, for controlling the performance of each computation.

2. A spectrometer according to claim 1, in which said computing means comprises two sample-and-hold circuits, means for applying to the respective inputs of the sample-and-hold circuits two synchronous pulses corresponding to each output pulse from the laser and respectively having magnitudes proportional to the detected intensities of the sample and reference beams for that output pulse, means for triggering the sample-and-hold circuits in response to the reception of a pulse of radiation by said first detector, and means for computing the ratio of the respective outputs of the sample-and-hold circuits.

* * * * *